United States Patent
Gatson et al.

(10) Patent No.: US 11,928,649 B2
(45) Date of Patent: Mar. 12, 2024

(54) RESOLVING REMOTE MEETING CONFLICTS USING LEARNED ATTRIBUTES AND CONTEXT INFORMATION

(71) Applicant: Dell Products, L.P., Round Rock, TX (US)

(72) Inventors: Michael S. Gatson, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 277 days.

(21) Appl. No.: 16/994,721

(22) Filed: Aug. 17, 2020

(65) Prior Publication Data

US 2022/0051196 A1 Feb. 17, 2022

(51) Int. Cl.
*G06Q 10/1093* (2023.01)
*G06F 9/445* (2018.01)
*G06N 20/00* (2019.01)
*G06Q 10/1091* (2023.01)
*H04L 12/18* (2006.01)

(52) U.S. Cl.
CPC ....... *G06Q 10/1095* (2013.01); *G06F 9/4451* (2013.01); *G06N 20/00* (2019.01); *G06Q 10/1091* (2013.01); *H04L 12/1818* (2013.01)

(58) Field of Classification Search
CPC .......... G06Q 10/1095; G06Q 10/1091; G06N 20/00; G06F 9/4451; H04L 12/1818
See application file for complete search history.

(56) References Cited

U.S. PATENT DOCUMENTS

| 11,379,797 | B2 * | 7/2022 | Kaufman | G06Q 10/1095 |
| 2011/0252097 | A1 * | 10/2011 | Walker | G06Q 10/06 709/204 |
| 2016/0148167 | A1 * | 5/2016 | Li | G06Q 10/1095 705/7.19 |
| 2017/0308866 | A1 * | 10/2017 | Dotan-Cohen | G06Q 10/1095 |
| 2019/0394057 | A1 * | 12/2019 | Bujnowski | G06Q 10/06 |
| 2020/0382646 | A1 * | 12/2020 | Rao | H04L 51/18 |
| 2021/0397991 | A1 * | 12/2021 | Gatson | G06N 20/00 |

\* cited by examiner

*Primary Examiner* — Dylan C White
(74) *Attorney, Agent, or Firm* — Fogarty LLP

(57) ABSTRACT

Embodiments of systems and methods for resolving remote meeting conflicts using learned attributes and context information are described. In some embodiments, an Information Handling System (IHS) may include a processor and a memory coupled to the processor, the memory having program instructions stored thereon that, upon execution by the processor, cause the IHS to: determine, based upon context information collected by the IHS, that a user of the IHS is more likely to attend a first remote meeting than a second remote meeting, where the first and second remote meetings are scheduled to take place, at least in part, concurrently; and in response to the determination, apply one or more settings to the IHS that are associated with the first remote meeting.

19 Claims, 5 Drawing Sheets

| MTG ID | SESSION INSTANCE | DATE | ATTENDED (Y/N) | PARTICIPATION START/END DURATION | LOCATION | AUDIO | OTHERS ATTRIBUTES | CURRENT STATE | SHORT CUT |
|---|---|---|---|---|---|---|---|---|---|
| | | | | INPUTS | | | | | NOTIFICATION |
| MTG_001 | FIRST | 2/5/2020 | Y | 8:01/8:59 58 MINS | • PEASE PARK CONFERENCE ROOM | • PC MIC/ SPEAKERS | • SPEECH • CONTENT | 1 | SHORT CUT 1 (INITIAL SESSIONS) PROMPT FOR CONSENT/SET AUDIO/PREFERENCES |
| | SECOND | 2/12/2020 | Y | 8:05/8:58 53 MINS | • PEASE PARK CONFERENCE ROOM | • PC MIC/ SPEAKERS | • SPEECH • CONTENT | 2 | SHORT CUT 2 (SECOND SESSIONS) PROMPT WITH COUNTDOWN CLOCK DEFAULT AUDIO/PREFERENCES |
| | THIRD | 2/19/2020 | Y | 8:01/9:01 60 MINS | • PEASE PARK CONFERENCE ROOM | • PC MIC/ SPEAKERS | • SPEECH • CONTENT | 3 | SHORT CUT 3 (SUB SESSIONS) MINIMAL PROMPT |
| | FOURTH | 2/26/2020 | Y | 8:30/8:55 25 MINS | • STARBUCKS PARMER | • HEADSET | • SPEECH • CONTENT | 1 | SHORT CUT 1 (NEW LOCATION) PROMPT FOR CONSENT/SET AUDIO/PREFERENCES |
| MTG_002 | FIRST | 2/26/2020 | N | N/A | • ZILKER PARK CONFERENCE ROOM | • N/A | • N/A | 1 | NO NOTIFICATION |

RESOLVING REMOTE MEETING CONFLICTS USING LEARNED ATTRIBUTES AND CONTEXT INFORMATION

FIELD

The present disclosure relates generally to Information Handling Systems (IHSs), and more particularly, to systems and methods for resolving remote meeting conflicts using learned attributes and context information.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can execute many different types of applications, including various conferencing applications such as remote meetings and presentations, video/audio conferencing, audio-only calls, and the like. In that regard, the inventors hereof have determined that if an IHS were able to anticipate or predict which of a plurality of scheduled meetings a participant is likely to join, the IHS could then be configured to facilitate the participant's tasks during the meeting by pre-loading relevant applications and data files, and/or by changing selected IHS settings in anticipation of the meeting.

SUMMARY

Embodiments of systems and methods for resolving remote meeting conflicts using learned attributes and context information are described. In some embodiments, an Information Handling System (IHS) may include a processor and a memory coupled to the processor, the memory having program instructions stored thereon that, upon execution by the processor, cause the IHS to: determine, based upon context information collected by the IHS, that a user of the IHS is more likely to attend a first remote meeting than a second remote meeting, where the first and second remote meetings are scheduled to take place, at least in part, concurrently; and in response to the determination, apply one or more settings to the IHS that are associated with the first remote meeting.

The context information may include at least one of: an identity of the user, a previous attendance to the first or second meetings, a role of the user in the first or second meeting, a user's participation rate, a time-of-day, a calendar event, or an application currently under execution. Additionally, or alternatively, the context information may be collected at least in part via one or more hardware sensors coupled to the IHS, and the context information may include at least one of: a user's proximity to the IHS, a user's gaze direction, a location of the IHS, a network connection, a power usage, a peripheral device coupled to the IHS, or an IHS posture.

To determine that the user of the IHS is more likely to attend the first remote meeting than the second remote meeting, the program instructions, upon execution, may cause the IHS to: transmit the context information to a remote server configured to make the determination using machine learning (ML); and receive an identification of the one or more settings from the remote server. To apply the one or more settings, the program instructions, upon execution, may cause the IHS to perform at least one of: load an application, close an application, load a data file, download a data file from a remote server, distribute a data file to another participant of the remote meeting, modify an audio setting of the IHS, modify a display setting of the IHS, or modify a power consumption setting of the IHS.

The one or more settings may be applied prior to a start time of the first remote meeting. The program instructions, upon execution, may cause the IHS to, prior to applying the one or more settings, prompt the user in anticipation of the first remote meeting, and application of the one or more settings may occur in response to the user accepting the prompt.

In some cases: (a) in response to a confidence level of the determination having a first value, the prompt may identify a first number of settings, (b) in response to a confidence level of the determination having a second value greater than the first value, the prompt may identify a second number of settings smaller than the first number; and (c) in response to a confidence level of the determination having a third value greater than the second value, the prompt: (i) may identify a third number of settings smaller than the second number or (ii) does not identify any of the one or more settings.

In another illustrative, non-limiting embodiment, a memory storage device may have program instructions stored thereon that, upon execution by one or more processors of an IHS, cause the IHS to: determine, based upon context information collected by the IHS, that a user of the IHS is more likely to attend a first remote meeting than a second remote meeting, wherein the first and second remote meetings are scheduled to take place, at least in part, concurrently; in response to the determination, prompt the user in anticipation of the first remote meeting; and in response to the user accepting the prompt, apply one or more settings to the IHS that are associated with the first remote meeting.

In yet another illustrative, non-limiting embodiment, a method may include determining, based upon context information collected by the IHS, that a user of the IHS is more likely to attend a first remote meeting than a second remote meeting, where the first and second remote meetings are scheduled to take place, at least in part, concurrently; in response to the determination, prompting the user in anticipation of the first remote meeting; and in response to the user accepting the prompt, applying one or more settings to the IHS that are associated with the first remote meeting.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 is a table illustrating examples of learned remote meeting attributes, according to some embodiments.

DETAILED DESCRIPTION

Figure 1:
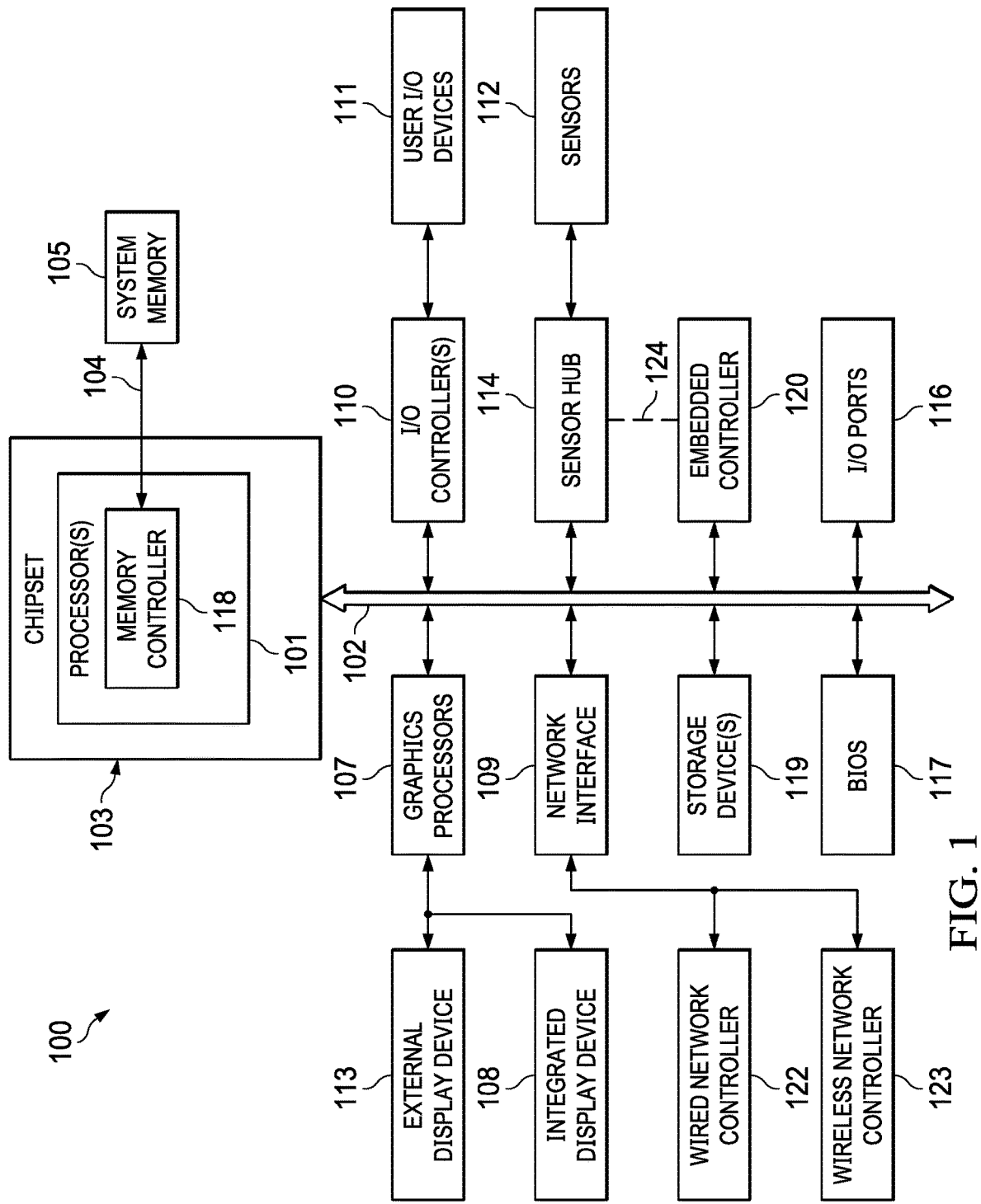
FIG. 1 is a block diagram of an example of an Information Handling System (IHS) configured to resolve remote meeting conflicts using learned attributes and context information, according to some embodiments.

Systems and methods are described for resolving remote meeting conflicts using learned attributes and context information. In some embodiments, these systems and methods may effect changes upon an IHS's system management, power, responsiveness, and other characteristics based upon attributes learned from previous remote meetings or presentations. Meeting attributes may include, for example, meeting logistics (e.g., time, location, etc.) and context information (e.g., current background noise levels, quality of network connection, available memory, etc.), as well as a digest of speech map(s), including the separation of individual conversations and keyword pairings.

In remote meetings and conference calls, there is usually an individual who serves as main host or moderator, another who serves as the meeting's facilitator or coordinator, and one or more other participants. The role of the facilitator typically includes scheduling the meeting or conference call and/or serving as a standby or alternate host in case the original host becomes unavailable during the meeting (e.g., due to a lost network connection, etc.). Conversely, responsibilities of the main host or moderator generally include initiating the meeting, presenting or leading discussions, moderating meeting participants, and/or summarizing results.

Certain calendaring and remote meeting applications provide options for notifying users prior to (or concurrently with) the start of a meeting. These notifications or "shortcuts" have conventionally been controlled via the participant's or host's settings selected at some time prior to the meeting, for example, when the original meeting invitation is sent. A recurring issue for participants receiving such meeting notifications, however, is the potential inconsistency in how notifications are set between different meeting events. Moreover, there can be conflicts between notifications of meetings that overlap in time. An additional issue is that there is currently no mechanism for assisting a participant with system settings that would help the participant conduct or participate in a particular meeting (e.g., automatic audio-video settings).

In contrast, in various embodiments described herein, systems and methods provide recommendations to reduce friction involved in joining a meeting including, but not limited to: AVS settings (e.g., headset vs. speakers), power (e.g., AC or DC, battery charge level, etc.), and responsiveness (e.g., preloading of applications, etc.), based on context information and attributes learned during previous meetings and presentations. Additionally, or alternatively, these systems and methods provide recommendations to aid a participant in resolving conflicts—i.e., selecting the highest priority meeting to join, and reducing friction for joining individual meetings.

Context information and attributes usable to provides these recommendations may include not only meeting logistics (e.g., time and location) and previous consent (e.g., acceptance/decline of meeting events), but also actual participation rate, including duration of participation, AVS settings, and other artifacts from meeting participation including content used, digest of speech maps, separation of individual conversations and keyword pairings.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured to resolve remote meeting conflicts using learned attributes and context information. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, gaze, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 112 may be part of a keyboard or other input device. Processor 101 may be configured to process information received from sensors 112 through sensor hub 114, and to perform methods for resolving remote meeting conflicts using learned attributes and contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112. For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or to produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
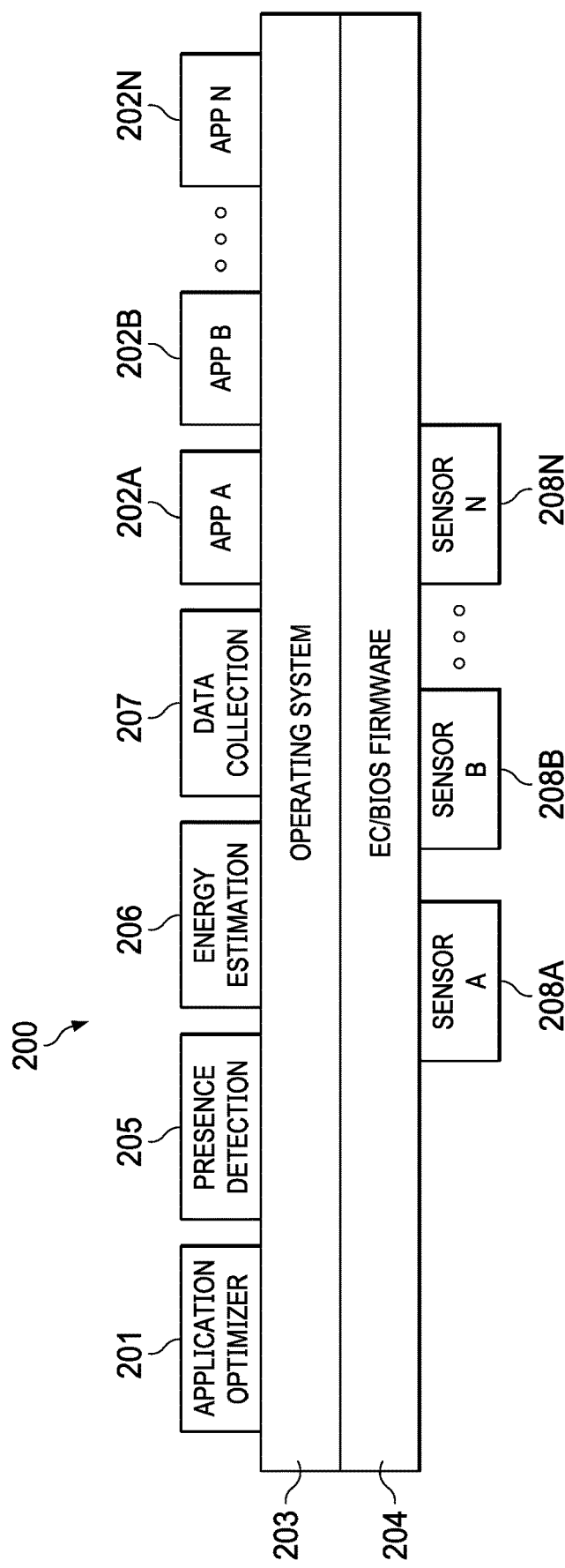
FIG. 2 is a block diagram illustrating an example of a software system configured to resolve remote meeting conflicts using learned attributes and context information, according to some embodiments.

FIG. 2 is a block diagram illustrating an example of software system 200 produced by IHS 100 for resolving remote meeting conflicts using learned attributes and context information. In some embodiments, each element of software system 200 may be provided by IHS 100 through the execution of program instructions by one or more logic components (e.g., CPU 100, BIOS 117, EC 120, etc.) stored in memory (e.g., system memory 105), storage device(s) 119, and/or firmware 117, 120.

As shown, software system 200 includes application optimizer engine 201 configured to manage the performance optimization of applications 202A-N. An example of application optimizer engine 201 is the DELL PRECISION OPTIMIZER Meanwhile, examples of applications 202A-N include, but are not limited to, computing resource-intensive applications such as remote conferencing applications, video editors, image editors, sound editors, video games, etc.; as well as less resource-intensive applications, such as media players, web browsers, document processors, email clients, etc.

Both application optimizer engine 201 and applications 202A-N are executed by OS 203, which is in turn supported by EC/BIOS instructions/firmware 204. EC/BIOS firmware 204 is in communications with, and configured to receive data collected by, sensor modules or drivers 208A-N—which may abstract and/or interface with respective ones of sensors 112.

In various embodiments, software system 200 also includes presence detection module or application programming interface (API) 205, energy estimation engine or API 206, and data collection module or API 207 executed above OS 203.

Presence detection module 205 may process user presence data received by one or more of sensor modules 208A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field, mid-field, or far-field.

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database that includes information related to IHS hardware utilization (e.g., by application, by thread, by hardware resource, etc.), power source (e.g., AC-plus-DC, AC-only, or DC-only), audio-video devices (e.g., headphones), etc.

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, the classifier may use the gathered data to characterize the application's workload with various settings, memory usage, responsiveness, etc. Moreover, application optimizer engine 201 may at least in part implement method 400, described in more in connection with FIG. 4 below.

Figure 3:
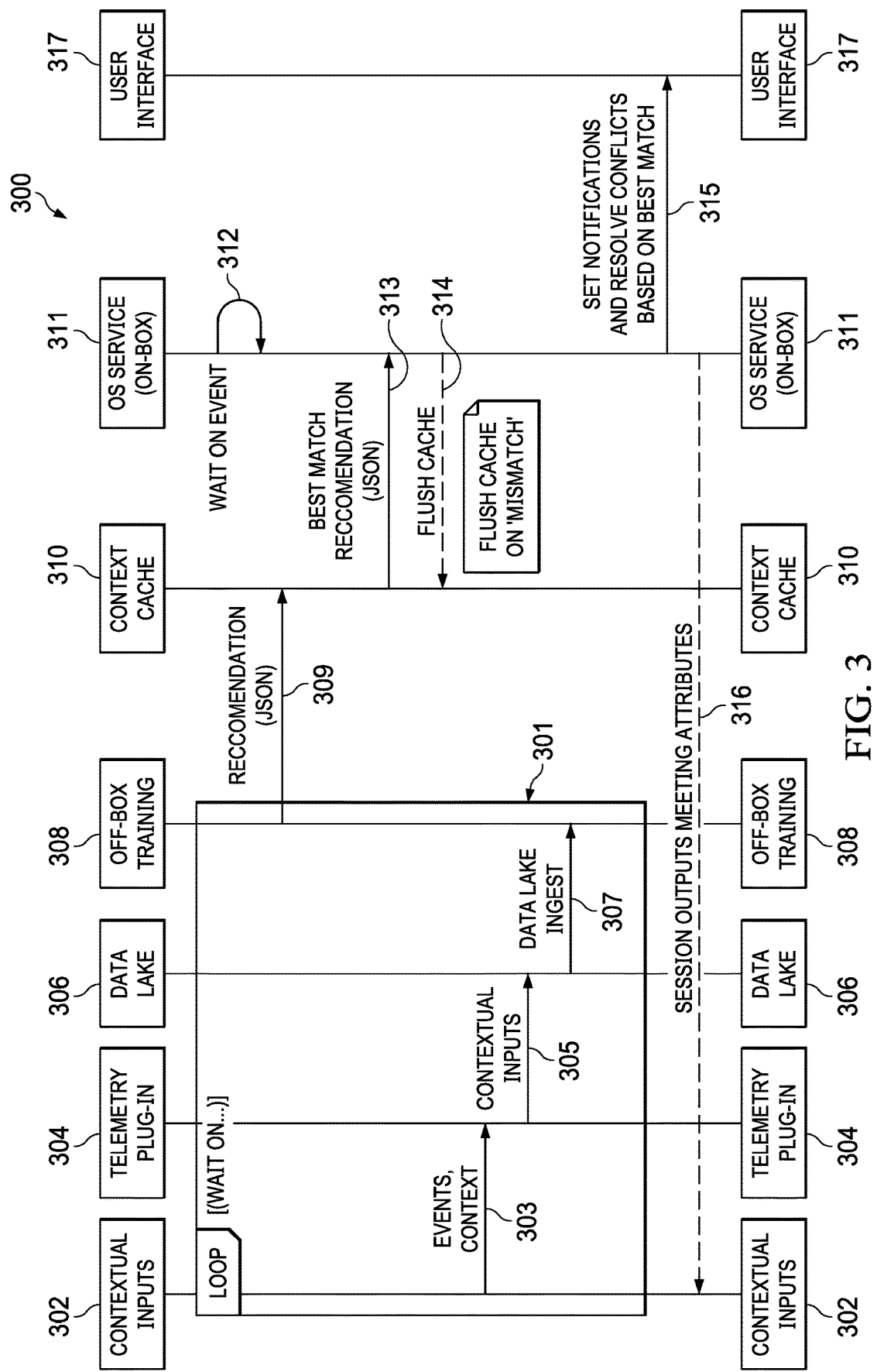
FIG. 3 is a diagram illustrating examples of messages exchanged during the performance of methods for resolving remote meeting conflicts using learned attributes and context information, according to some embodiments.

FIG. 3 is a diagram illustrating examples of messages 300 exchanged during the performance of methods for resolving remote meeting conflicts using learned attributes and context information. In some embodiments, messages 300 may be exchanged, at least in part, in response to the operation of application optimization engine 201, here implemented at least in part as OS service 311.

Particularly, OS service 311 may monitor applications 202A-N executing on IHS 100, gather data for a predetermined period of time, and use the gathered data to determine, using a machine learning (ML) algorithm (e.g., a recurrent neural network, etc.), the likelihood that a given participant of an upcoming remote meeting (e.g., a voice conference, a video conference, a remote presentation, etc.) is likely to attend a give one of a plurality of conflicting meetings, and settings or preferences likely to be most useful for that particular meeting.

In some cases, the likelihood that a participant will attend an upcoming remote meeting may assume one of two possible binary values (e.g., yes or no). In other cases, a confidence score (e.g., on a scale between 1 and 3) may be attributed to each competing remote meeting, using prior attendance and current context information, such that the meeting with highest score may be deemed the most likely for the participant to attend.

In response to these determinations, OS service 311 may provide different shortcuts with corresponding levels of automation of preferences/settings (e.g., by automatically applying one or more settings to the IHS). For example, OS service 311 executed by IHS 100 may include routines that, upon execution, configure IHS 100 to learn and get inputs from user and/or system context. In some cases, contextual inputs may be gathered and placed in a repository for training.

Examples of contextual inputs include, but are not limited to: platform/sensor input, eye/facial tracking, I/O (headphone, keyboard, mouse, stylus, etc.), location, voice/gesture, biometrics, audio, application/OS/user, foreground application, time spent using an application, services/processes, time-of-day, calendar/scheduled events, system hardware settings, environmental inputs, ambient sound, ambient lighting, weather, other events, etc.

For example, a first portion of the context information may be collected using sensors 208A-N, and a second portion may be collected using presence detection module 205, energy estimation engine 206, and/or data collection module 207.

The steady-state data collection and operation routines, upon execution, may also handle real-time recommendations using context, and may output an identification of the host and/or of an alternate host, as well as an ordered list of selected IHS settings for those roles. Examples of such settings include, but are not limited to: starting an application in online or offline mode, starting a number of web browser tabs with different web addresses, close an application, load a data file, download a data file from a remote server, distribute a selected data file to another participant of the remote meeting, modify an audio setting of the IHS (e.g., microphone level, speaker level, noise reduction or other signal processing parameter, etc.), modify a display setting of the IHS (e.g., screen on or off, brightness, etc.), or modify a power consumption setting of the IHS (e.g., throttle a processor turbo modes, setting peripheral devices on standby, etc.).

In that regard, OS service 311 may be configured to perform or invoke (e.g., from a remote server) ML training and inference I/O parametrization, and to produce data structures in any format (e.g., JavaScript Object Notation or JSON schema, XML files, etc.) suitable for consumption.

In some cases, one or more of the aforementioned settings may be applied prior to a start time of the remote meeting. Additionally, or alternatively, the one or more of these settings may be applied during the remote meeting, for instance, upon the detection of a triggering event of the like (e.g., a point during the meeting when the host drops off, a keyword is spoken, etc.).

Still referring to FIG. 3, loop 301 receives context information and events 303 from contextual inputs 302 and transforms those events and context information 303 into contextual inputs 305 via telemetry plug-in module 304. Data lake 306 stores contextual inputs 305 and provides data lake ingest 307 to off-box training server 308 (e.g., a remote server). In some cases, off-box training server 308 may be configured to learn and select IHS settings based upon prior remote meeting attributes and events.

Off-box training server 308 may then provide recommendation 309 (e.g., a data structure following a JSON schema, or the like) to context cache 310, which stores historical context information associated with previous remote meetings and therefore supports the stateful processing of such information.

OS service 311 (e.g., application optimizer 201) is executed by IHS 100, waits to detect an event 312 (e.g. an upcoming calendar meeting or conference) and, in response to detecting the event 311, uses best-match recommendation 313 to apply optimizations (e.g., IHS settings) to IHS 100 in anticipation of event 312, at the time of event 312, during event 312, and/or after the termination of event 312.

When OS service 311 detects a mismatch, command 314 may be sent to context cache 310 to flush the cash. Moreover, OS service 311 may set notifications and resolve conflicts 315 via user interface 316 based upon recommendation 313, and it may also output current meeting attributes to contextual inputs 302 for continued learning.

In sum, a calibration and configuration phase may be configured to learn and/or to obtain inputs (telemetry) such as: user context, system context, and meeting attributes. User context may include, but it is not limited to: calendar, time of day, previous meeting consent (accept/decline), and applications, services, and processes (e.g., a presentation application) correlated with system context. Meanwhile, system context may include, but it is not limited to: geographic location, system settings, including audio/video/speech settings, attached peripherals, AC vs. DC runtime operation, and environmental parameters. Moreover, meeting attributes may include, but are not limited to: participation rate, duration of participation, AVS settings, content, voice mapping (to identify active participation), etc. In some implementations, a user may manually choose, as part of calibration process, the applications he or she wants to keep track of for learned placement.

A local cache of context may be assigned to a Meeting ID for each meeting instance. Derived meeting states may be based on ML methods (e.g., states 1, 2, and 3 can represent different increasing levels of understood settings on number of instances of specific meeting ID captured and learned settings). Rules may be based on context and/or derived states.

In steady state, systems and methods described herein may collect input context, including calendar input, system, user, environment, etc. find a nearest best configuration learned for that input context, if not already learned earlier, and apply corresponding application and runtime settings. Moreover, the cache may be flushed to undo learned shortcuts (e.g., if there is no match or if the user "disagrees" with the ML inference). Notifications may be provided to the user, including shortcuts based on a known state, so that additional actions may be based on context. As such, these systems and methods may provide resolution of meeting conflicts based on best match of identified Meeting IDs with steady state context.

Figure 4:
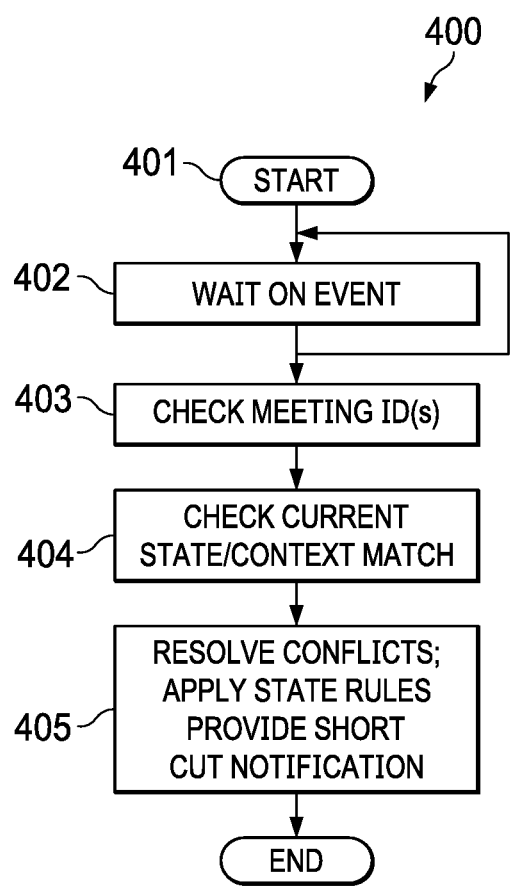
FIG. 4 is flowchart illustrating an example of a method for resolving remote meeting conflicts using learned attributes and context information, according to some embodiments.

FIG. 4 is flowchart illustrating an example of method 400 for resolving remote meeting conflicts using learned attributes and context information. In some embodiments, method 400 may be performed in response to program instructions stored in memory 105 and executed by processor 101. Particularly, method 400 begins at block 401.

At block 402, method 400 waits for a triggering event. For example, a triggering event may be the receipt of a meeting invitation, by a meeting application, a calendaring application, an email or messaging client, etc. set up by the meeting's facilitator or coordinator. In some cases, event 402 may be the opening/execution of a meeting or a calendaring application, the logging onto IHS 100 of a particular user, etc. In other cases, the event of block 402 may be the periodic expiration of a timer, or a user-selectable trigger.

At block 403, method 400 checks a meeting ID of an upcoming meeting. Then, at block 404, method 400 checks the current state/context match(es). For example, each remote meeting may produce a record in a persistent cache containing a meeting ID (e.g., JSON) as follows:

Meeting_id→[{date_of_mtg, user_attended_from, user_attended_Y_or_N, user_attended_from_ When_to_when if_partial_Attendance, {date_of_mtg2, user_attended_from, user_attended_Y_or_N, user_attended_from_When_to_when_if_partial_Attendance, . . . }]

Meanwhile, correlated derived states may be stored as follows: [{meeting_id, {location_attended_from, length_of_attendance, calendar_state_Accept_Tentative_decline, meeting_ready_State_1_2_or_3, . . . {location2_attended_from, length_of_attendance, calendar_state_Accept_Tentative_decline, meeting_ready_State_1_2_or_3, . . . }]

Then, at block 405, method 400 (i) applies one or more state rules selected, using machine learning, to resolve conflicts between concurrently scheduled remote meetings, and (ii) provides the IHS user with a corresponding shortcut or notification.

For example, a shortcut or notification may be a pop-up window or a message with a link or button that reminds/notifies the meeting participant of the upcoming meeting (in this case, one of two or more conflicting meetings that the participant is most likely to attend). A given shortcut or notification may include varying degrees and/or number of options and/or settings for the participant to select and/or be aware of. The higher the confidence of the conflict resolution operation of block 405, the fewer the options presented to the participant. That is, if the conflict between meetings is resolved with a low degree of confidence, a corresponding shortcut or notification may present more options and/or warnings, such that the process of joining the meeting is less automated (or manual). Conversely, if the conflict between meetings is resolved with a high degree of confidence, the corresponding shortcut or notification may present fewer options and/or warnings, such that the process of joining the meeting is more (or fully) automated.

To illustrate, FIG. 5 shows table 500 with examples of learned remote meeting attributes. In these examples, a first meeting has a "MTG_001" ID, and a second meeting has a "MTG_002" ID. The first meeting has occurred 4 times on different dates, and this particular participant has attended all of them. Each record contains additional context information about each instance of the meeting, including the start and end times, the location from which the meeting was attended by the participant, audio settings (e.g., whether or not a headphone was used), and other meeting attributes such as speech (e.g., a speech map that indicates who did what and when during the meeting, which participant is likely hosting of leading the meeting, etc.) and/or content.

As additional instances of the first meeting continue to take place, a confidence score ("current state") is associated with the meeting which indicates the likelihood that the participant will attend that meeting (e.g., on a scale from 1 to 3, from lowest to highest confidence). In this example, the first three instances of the first meeting are sufficiently consistent for an ML algorithm to increment the confidence score from 1 to 3; but in the fourth instance the participant is at a different location, using a headset, and participates in the meeting less time that in other instances, so the ML algorithm decrements the confidence score back to 1.

Consequently, in referring to the example of Table 500, when and/or after the first instance of the first meeting (with a current state value "1") is detected, the participant is presented with a first shortcut that prompts for consent and provides the ability to set audio and/or other preferences. When and/or after the second instance of the first meeting (with a current state value "2") is detected, a second shortcut is presented to the participant that provides a countdown to the start of the meeting and sets up default audio and/or other preferences. By the time the third instance of the first meeting (with a current state value "3") is presented to the participant, a third shortcut provides a minimum prompt to that participant. When and/or after the fourth instance of the first meeting (with a current state value "1") takes place, however, the first shortcut is again selected for presentation to the participant.

To further explain the operation of the systems and methods described herein, consider the following use-cases:

Example A: Michael is working at his desk. It is 10:00 AM, and he has three weekly meetings scheduled in the same time slot. Typically, Michael attends "meeting A" about 50% of the time and "meeting B" about 50%; even though, he has accepted "meeting A" and marked "meeting B" as tentative. He never joins "meeting C." When joining "meeting A," he participates actively using his headset. When joining "meeting B," he only listens in with speakers, and occasionally with headset. In operation, method 400 recognizes he is likely joining "meeting A" this particular week and that he recently connected his headset. As such, systems and methods described herein may provide a notification and set settings for "meeting A" with a hint to optionally join "meeting B," and suppresses notification for "meeting C."

Example B: Michael is traveling between conference rooms and stops to check e-mail. He has two meetings scheduled for 10 minutes from now. He attends both meetings with approximately equal frequency, but he consistently attends them based on proximity to the individual meeting rooms. In this case, the systems and methods described herein may recognize Michael's location relative to previous attended meetings and provide notification and settings for the most likely meeting that Michael will attend in his current context.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor;
   a sensor hub collecting context information from a plurality of sensors coupled to the sensor hub;
   an embedded controller coupled to the sensor hub via an out-of-band signaling pathway; and
   a memory coupled to the processor, the memory having program instructions stored thereon that, upon execution by the embedded controller, cause the embedded controller to:
   determine, based upon context information collected by at least one of the plurality of sensors that are coupled to the sensor hub, that a user of the IHS is more likely to attend a first scheduled remote meeting than a second scheduled remote meeting, wherein the first and second scheduled remote meetings are, prior to the determination, scheduled to take place, at least in part, concurrently, and wherein the embedded controller retrieves the context information from the sensor hub via the out-of-band signaling pathway;
   in response to the determination, prompt the user on a graphical user interface (GUI) in anticipation of the first scheduled remote meeting; and
   in response to the user accepting the prompt on the GUI, modify a power consumption setting to the IHS that is associated with the first scheduled remote meeting.

2. The IHS of claim 1, wherein the context information comprises at least one of: an identity of the user, a previous attendance to the first or second meetings, a role of the user in the first or second meeting, a user's participation rate, a time-of-day, a calendar event, or an application under execution.

3. The IHS of claim 1, wherein the context information is collected at least in part via one or more hardware sensors coupled to the IHS, and wherein the context information comprises at least one of: a user's proximity to the IHS, a user's gaze direction, a location of the IHS, a network connection, a power usage, a peripheral device coupled to the IHS, or an IHS posture.

4. The IHS of claim 1, wherein to determine that the user of the IHS is more likely to attend the first scheduled remote meeting than the second scheduled remote meeting, the program instructions, upon execution, further cause the IHS to:
transmit the context information to a remote server configured to make the determination using machine learning (ML); and
receive an identification of the one or more power consumption settings from the remote server.

5. The IHS of claim 1, wherein in addition to applying a power consumption setting, the program instructions, upon execution, further cause the IHS to perform at least one of: load an application, close an application, load a data file, download a data file from a remote server, distribute a data file to another participant of the remote meeting, modify an audio setting of the IHS, and modify a display setting of the IHS.

6. The IHS of claim 1, wherein the power consumption setting is applied prior to a start time of the first scheduled remote meeting.

7. The IHS of claim 1, wherein the program instructions, upon execution, further cause the IHS to, prior to applying the power consumption setting, prompt the user in anticipation of the first scheduled remote meeting, and wherein the application of the power consumption setting occurs in response to the user accepting the prompt.

8. The IHS of claim 7, wherein at least one of: (a) in response to a confidence level of the determination having a first value, the prompt identifies a first number of power consumption settings, (b) in response to a confidence level of the determination having a second value greater than the first value, the prompt identifies a second number of power consumption settings smaller than the first number; and (c) in response to a confidence level of the determination having a third value greater than the second value, the prompt: (i) identifies a third number of power consumption settings smaller than the second number or (ii) does not identify any of the one or more power consumption settings.

9. A memory storage device having program instructions stored thereon that, upon execution by one or more processors of an Information Handling System (IHS), cause the IHS to:
collect, by a sensor hub installed in the IHS, context information from a plurality of sensors coupled to the sensor hub;
determine, based upon context information collected by at least one of the plurality of sensors that are coupled to the sensor hub, that a user of the IHS is more likely to attend a first scheduled remote meeting than a second scheduled remote meeting, wherein the first and second scheduled remote meetings are, prior to the determination, scheduled to take place, at least in part, concurrently, wherein the context information is retrieved from the sensor hub by an embedded controller of the IHS via an out-of-band signaling pathway between the embedded controller and the sensor hub;
in response to the determination, prompt the user on a graphical user interface (GUI) in anticipation of the first scheduled remote meeting; and in response to the user accepting the prompt on the GUI, modify a power consumption setting to the IHS that is associated with the first scheduled remote meeting.

10. The memory storage device of claim 9, wherein at least one of: (a) in response to a confidence level of the determination having a first value, the prompt identifies a first number of power consumption settings, or (b) in response to a confidence level of the determination having a second value greater than the first value, the prompt identifies a second number of power consumption settings smaller than the first number.

11. The memory storage device of claim 9, wherein the context information comprises at least one of: an identity of the user, a previous attendance to the first or second scheduled remote meetings, a role of the user in the first or second scheduled remote meeting, a user's participation rate, a time-of-day, a calendar event, or an application under execution.

12. The memory storage device of claim 9, wherein the context information is collected at least in part via one or more hardware sensors coupled to the IHS, and wherein the context information comprises at least one of: a user's proximity to the IHS, a user's gaze direction, a location of the IHS, a network connection, a power usage, a peripheral device coupled to the IHS, or an IHS posture.

13. The memory storage device of claim 9, wherein to determine that the user of the IHS is more likely to attend the first scheduled remote meeting than the second scheduled remote meeting, the program instructions, upon execution, further cause the IHS to:
transmit the context information to a remote server configured to make the determination using machine learning (ML); and
receive an identification of the one or more power consumption settings from the remote server.

14. The memory storage device of claim 9, wherein in addition to applying a power consumption setting, the program instructions, upon execution, further cause the IHS to perform at least one of: load an application, close an application, load a data file, download a data file from a remote server, distribute a data file to another participant, modify an audio setting of the IHS, and modify a display setting of the IHS.

15. A method, comprising: collecting, by a sensor hub instated in an IHS, context information from a plurality of sensors coupled to the sensor hub;
determining, based upon context information collected by at least one of the plurality of sensors that are coupled to the sensor hub of the Information Handling System (IHS), that a user of the IHS is more likely to attend a first remote meeting than a second remote meeting, wherein the first and second remote meetings are scheduled to take place, at least in part, concurrently, wherein the context information is retrieved from the sensor hub by an embedded controller of the IHS via an out-of-band signaling pathway between the embedded controller and the sensor hub;
in response to the determination, prompting the user on a graphical user interface (GUI) in anticipation of the first remote meeting; and
in response to the user accepting the prompt on the GUI, modifying a power consumption setting to the IHS that is associated with the first remote meeting.

16. The method of claim 15, wherein at least one of: (a) in response to a confidence level of the determination having a first value, the prompt identifies a first number of power consumption settings, or (b) in response to a confidence level of the determination having a second value greater than the first value, the prompt identifies a second number of power consumption settings smaller than the first number.

17. The method of claim 15, wherein the context information comprises at least one of: an identity of the user, a previous attendance to the first or second meetings, a role of the user in the first or second meeting, a user's participation rate, a time-of-day, a calendar event, or an application under execution.

18. The method of claim 15, wherein the context information is collected at least in part via one or more hardware sensors coupled to the IHS, and wherein the context information comprises at least one of: a user's proximity to the IHS, a user's gaze direction, a peripheral device coupled to the IHS, or an IHS posture.

19. The method of claim 15, wherein to determining that the user of the IHS is more likely to attend the first remote meeting than the second remote meeting further comprises:
   transmitting the context information to a remote server configured to make the determination using machine learning (ML); and
   receiving an identification of the one or more power consumption settings from the remote server.

\* \* \* \* \*